(12) United States Patent
Clapa et al.

(10) Patent No.: US 11,902,329 B2
(45) Date of Patent: Feb. 13, 2024

(54) INTEGRATION OF AN ORCHESTRATION SERVICES WITH A CLOUD AUTOMATION SERVICES

(71) Applicant: ATOS UK IT LIMITED, London (GB)

(72) Inventors: Konrad Clapa, Lodz (PL); Olena Zhuk, Zurich (CH)

(73) Assignee: AGARIK SAS, Saint-Ouen (FR)

( * ) Notice: Subject to any disclaimer, the term of this patent is extended or adjusted under 35 U.S.C. 154(b) by 128 days.

(21) Appl. No.: 17/123,894

(22) Filed: Dec. 16, 2020

(65) Prior Publication Data
US 2021/0185007 A1  Jun. 17, 2021

(30) Foreign Application Priority Data

Dec. 17, 2019  (EP) .................................... 19217193

(51) Int. Cl.
 *H04L 9/40* (2022.01)
(52) U.S. Cl.
 CPC ............ *H04L 63/20* (2013.01); *H04L 63/029* (2013.01); *H04L 63/104* (2013.01)
(58) Field of Classification Search
 CPC ..... H04L 63/20; H04L 63/029; H04L 63/104; G06F 9/5072
 See application file for complete search history.

(56) References Cited

U.S. PATENT DOCUMENTS

| | | | |
|---|---|---|---|
| 11,537,627 B1* | 12/2022 | Baskaran | ............. G06F 16/951 |
| 2016/0065417 A1 | 3/2016 | Sapuram et al. | |
| 2016/0112453 A1* | 4/2016 | Martinez | ................. H04L 63/20 726/1 |
| 2016/0269427 A1* | 9/2016 | Haugsnes | ............. H04L 63/145 |
| 2017/0339188 A1* | 11/2017 | Jain | ......................... G06F 9/455 |
| 2018/0027006 A1* | 1/2018 | Zimmermann | ..... G06F 21/6218 726/11 |
| 2018/0351957 A1* | 12/2018 | Mott | ....................... H04L 63/20 |

(Continued)

FOREIGN PATENT DOCUMENTS

| | | |
|---|---|---|
| FR | 3075528 | 6/2019 |
| WO | 2012021324 | 2/2012 |

(Continued)

OTHER PUBLICATIONS

Van Rossem, Steven; et al., "A Vision for the Next Generation Platform-as-a-Service," 2018 IEEE 5G World Forum (5GWF), Silicon Valley, CA, USA, 2018, pp. 14-19, doi: 10.1109/5GWF.2018.8516972.*

(Continued)

*Primary Examiner* — Victor Lesniewski
(74) *Attorney, Agent, or Firm* — ARC IP Law, PC; Joseph J. Mayo

(57) ABSTRACT

A system for managing security on a cloud management platform portal (CMPP (1)), the system comprising a set of routines (scripts) which are executed on a computing device or processor allowing the cloud management platform portal to contact a cloud automation service (CAS (4)) so as to provision services to a customer, and a ServiceNow (2) (SNOW) application comprising at least one of a set of routines comprising at least one of certain specified network Standard Service Requests and/or network activity Standard Service Requests.

13 Claims, 7 Drawing Sheets

(56) References Cited

U.S. PATENT DOCUMENTS

| | | | | |
|---|---|---|---|---|
| 2018/0359145 | A1* | 12/2018 | Bansal | H04L 41/0894 |
| 2019/0220285 | A1* | 7/2019 | Ali | G06F 9/4401 |
| 2019/0356697 | A1* | 11/2019 | Chougule | G06F 9/45558 |
| 2019/0386960 | A1* | 12/2019 | Huang | H04L 63/0263 |
| 2020/0007620 | A1* | 1/2020 | Das | H04L 67/62 |
| 2020/0036593 | A1* | 1/2020 | Sethi | H04L 41/145 |
| 2020/0151609 | A1* | 5/2020 | Ambardekar | H04L 47/127 |
| 2020/0328941 | A1* | 10/2020 | Feiguine | H04L 41/0895 |
| 2020/0358756 | A1* | 11/2020 | Rose | H04L 63/0815 |
| 2021/0021471 | A1* | 1/2021 | Jayaraman | H04L 12/4641 |
| 2021/0185093 | A1* | 6/2021 | Pollitt | H04L 41/0893 |

FOREIGN PATENT DOCUMENTS

| | | |
|---|---|---|
| WO | 2019121677 | 6/2019 |
| WO | 2019121679 | 6/2019 |

OTHER PUBLICATIONS

Search Report issued in EP19217193.2 dated May 20, 2020 (9 pages).

* cited by examiner

INTEGRATION OF AN ORCHESTRATION SERVICES WITH A CLOUD AUTOMATION SERVICES

TECHNICAL FIELD OF THE INVENTION

The invention relates to the field of cloud services management and provision.

STATE OF THE PRIOR ART

Generally, cloud service providers offering hybrid and or multi-cloud services to major corporation has the challenge of providing orchestration of a vast number of legacy infrastructures of multiple customers and multi-cloud environments (Private/Public/Various brands GCP, AWS, Azure, VMware, OracleVM).

Virtualization of computing infrastructures is a fundamental process that powers cloud computing in order to provide services to customers requesting services on a cloud platform through a portal. However, when the features of the virtualization software are not well integrated with a services management unit of the cloud platform, the customers may not be able to access certain functionalities of the cloud platform, which can have a negative impact on the quality of service provided by said cloud platform.

For example, customers using the ServiceNow (a cloud service orchestration/processing module) cloud management portal (CMP) are not able to leverage said ServiceNow cloud management portal (CMP) to provision services via a Cloud Automation Service (CAS). Only basic integration with vSphere, a virtualization software, is present. This only includes provisioning and powers state changes services. The very basic integration does not allow to manage vSphere Virtual Machines (VMs) using the cloud management portal.

The implication is that customers using ServiceNow (SNOW) Cloud management portal (CMP) are not able to get fully featured vSphere capabilities. The current vCenter implementation is limited in scope and lacking flexibility for extension and innovation around the Vmware environment.

Therefore, there is a need for a system that solves this typical problem.

SUMMARY OF THE INVENTION

The present invention therefore has the object to obviate certain drawback of the prior art by proposing a computing infrastructure for providing cloud services to customers.

This goal is achieved by a system for managing security on a cloud management platform portal (CMPP), the system comprising a set of routines (scripts) which are executed on a computing device or processor allowing the cloud management platform portal to contact a cloud automation service (CAS) by using a REST API (Representational State Transfer Application Programing Interface) to access and configure a set of functionalities of the CAS of the platform hosting services in a portal so as to provision services to a customer, and a ServiceNow (SNOW) application comprising at least one set of herebelow routines comprising at least one of the following:
- a network Standard Service Request (SSR) to delete a security group (SG)
- a network SSR to create a new Security group
- a network SSR to modify an existing Security group
- a network activity SSR to delete a Software-Defined Networking (SDN) Security group rule on hyper-converged platforms
- a network activity SSR to create a new SDN Security group rule on hyper-converged platforms
- a network activity SSR to modify an existing SDN (Software defined Networking) Security group rule on hyper-converged platforms According to another feature, the system comprises a set of routines the execution of which on a processor provides to the CMPP a set of functionalities and applications comprising at least:
- a ServiceNow (SNOW) application comprising the above set of SSRs for delivering a set of services and comprising a Master Snow Workflow Dispatcher (MSWD)
- a REST API (Representational State Transfer Application Programing Interface)
- a MID (MID Server is a Java application that runs on a server on a local network) server for allowing communication and movement of data between the platform and external applications, data sources, and services or for passing a call to Master vRO dispatcher
- a Master vRO (vRealize Orchestrator) for automation of workflow processes
- a slave vRo for automation of workflow processes
- a set of Security Group Applications (SGA) for implementing processes related to security group set up
- a Disaster recovery (DR) Pod application for hosting workloads after disaster occurs in a primary site
- a cloud Management database (CMDB)

According to another feature, the set of functionalities and applications also comprises:
- a set of SDN security group rule applications for implementing processes related to security group rule set up
- a NSX Firewall comprising distributed and edge firewall
- a SSR workflow dispatcher Another goal of the invention also concerns a method for providing cloud services to customers.

This goal is achieved by a process for managing a security group on a cloud management platform portal by means of a system for managing security as described in the invention, the system comprising a set of software codes executed on a processor of the platform to implement the process for managing a security group, said process being characterized in that it comprises at least one of the following:
- Creating a security group (SG)
- Modifying an existing security group
- Deleting a security group
- Adding server to a security group
- Removing a virtual server to a security group
- Configuring a SDN security group rule According to another feature, a set of software codes is executed on the platform for creating a security group (SG), said creation of a security group process comprising:
- Inviting a user to fill in a form and submit it in ServiceNOW through an interactive interface of the CMPP,
- Calling a Rest API call
- passing the call to Master vRO dispatcher by means of the MID Server
- calling a SSR "Create a Security group workflow" by means of the Master vRO dispatcher controlling the Master worflows
- triggering a "Create Security group wrapper" by means of a Master workflow
- triggering a remote workflow on slave vRO by means of the Security Group Wrapper updating data on a NSX firewall via rest API by means of the Slave vRO workflow triggering Provision Security Group Configuration Item in CMDB workflow by means of the Master workflow triggering Modify Name of Security Group belonging to the "Modify SG" SSR with Sys_id Wrapper (which is returned by CMDB) workflow by means of the Master vRO workflow.

Modifying Name and description of Security Group via rest API by means of the Slave vRO workflow If DR Pod (11a) exists, then triggering in the same way creation of Security Group in Slave vRO of DR Pod (11a)

updating the status of the request to SNOW via Rest API by means of the Master Snow Workflow Dispatcher.

According to another feature, a set of software codes is executed on the platform for modifying an existing security group, said modification of an existing security group process comprising the following steps:

Inviting a user to fill in a form and submit it in Service-NOW through an interactive interface of the CMPP Calling a Rest API call passing the call to Master vRO dispatcher by means of the MID Server calling a SSR (IIAAS306c) "Modifying a security group workflow" by means of the Master vRO dispatcher triggering Modify a Security group wrapper by means of the Master workflow triggering remote workflow on slave vRO by means of the security group Wrapper updating data on a NSX firewall by means of Slave vRO workflow via rest API If DR Pod (11a) exists, then triggering the same way, modification of Security Group in Slave vRO of DR Pod updating the Status of the request to SNOW by means of the Snow Workflow Dispatcher (MSWD) via Rest API According to another feature, a set of software codes is executed on the platform for deleting a security group, said deletion of a security group process comprising the following steps:

Inviting a user to fill in a form and submit it in Service-NOW through an interactive interface of the CMPP Calling a Rest API call passing the call to Master vRO dispatcher by means of the MID Server calling a "deleting a security group workflow" by means of the Master vRO dispatcher triggering Delete Security group wrapper by means of the Master workflow or triggering "APPLY_ON" SG Delete Security group wrapper by means Master workflow triggering remote workflow on slave vRO by means of the delete Security Group Wrapper updating data on NSX by means of the Slave vRO workflow via rest API If DR pod exists, then triggering in the same way removing of Security Groups in Slave vRO of DR Pod triggering Provision Security Group Configuration Items in CMDB workflow by means of the Master workflow, if DR Pod does not exist updating CMDB security group Configuration Items by means of Provision Security Group CI in CMDB workflow via Snow Rest API updating the Status of the request to SNOW by means of the Snow Workflow Dispatcher via Rest API.

According to another feature, a set of software codes is executed on the platform for configuring a SDN security group rule, said configuration of a SDN security group rule process comprising at least one of the sub-steps:

Creating a SDN security group rule;
Modifying a SDN security group rule;
Deleting SDN security group rule According to another feature, a set of software codes is executed on the platform for creating a SDN security group rule, said creation of a SDN security group rule process, comprising:

Inviting a user to fill in a form and submit it in Service-NOW through an interactive interface of the;

passing the call to Master vRO dispatcher by means of the MID Server triggering SNOW Workflow Dispatcher with following input WorfklowID (Friendly name of the vRO workflow to be executed)

Json (containing Parameters with input parameter for workflow to be executed)

RITMID (identifier of the request in SNOW that will be updated with status by SNOW Workflow dispatcher workflow)

triggering a SSR "create SDN security group rule" Workflow passing all input parameters by means of the SNOW Workflow Dispatcher calling Create NSX Firewall Rule Wrapper workflow creating Inputs for the Create NSX Firewall Rule workflow and passing them through to the workflow via the Multi-Node Execute workflow wrapper created an NSX Firewall Rule under a new or existing Firewall section within the Create NSX Firewall Rule workflow on the slave POD executing the Provision Firewall Rule CI in SNOW CMDB workflow to keep CMDB up to date at return to the main ACCP (Atos cloud control platform) workflow after successful Firewall rule creation executing Modify NSX Firewall Rule Wrapper workflow to rename new firewall rule name with identity of database CMDB id executing Disaster recovery (DR) Enabled entry check calling DR Create NSX Firewall Rule Wrapper workflow creating Inputs for the DR Create NSX Firewall Rule Wrapper workflow and passing them through to the workflow via a Multi-Node Execute workflow wrapper According to another feature, a set of software codes is executed on the platform for modifying a SDN security group rule, said modification of a SDN security group rule process comprising the following steps:

Inviting a user to fill in a form and submit it in Service-NOW through an interactive interface of the CMPP;

passing the call to Master vRO dispatcher by means of the MID Server triggering SNOW Workflow Dispatcher with following input WorfklowID (Friendly name of the Master vRO workflow to be executed)

Json (containing Parameters with input parameter for workflow to be executed)

RITMID (identifier of the request in SNOW that will be updated with status by SNOW Workflow dispatcher workflow)

triggering a SSR "Modify SDN security group rule Workflow" passing all input parameters by means of the SNOW Workflow Dispatcher calling the Modify NSX Firewall Rule Wrapper workflow creating Inputs for the Modify NSX Firewall (FW) Rule workflow and passing them through to the workflow via a Multi-Node Execute workflow wrapper modifying an NSX Firewall Rule under an existing Firewall section within the Modify NSX Firewall Rule workflow on the slave POD, is checking whether DR Pod and DR Location information was sent from snow at the return to the main ACCP workflow after a successful FW rule modification, If yes—calling the same wrapper workflow for DR pod and making same modifications to DR Firewall Rule, the Firewall Rule on DR site being searched by name+ DR suffix.

If no, executing Provision Firewall Rule CI in SNOW CMDB workflow to keep CMDB up to date Updating the Status of the request to SNOW via Rest API by means of the Snow Workflow Dispatcher.

According to another feature, a set of software codes is executed on the platform for deleting a SDN security group rule, said deletion of a SDN security group rule process comprising the following steps Inviting a user to fill in a form and submit it in Service-NOW through an interactive interface of the CMPP calling Rest API call passing the call to Master vRO dispatcher by means of the MID Server calling SSR Delete SDN Security group Rule workflow by dispatcher triggering Delete NSX Firewall Rule wrapper by means of the Master workflow triggering remote workflow on slave vRO by means of the NSX Firewall Rule wrapper updating data on NSX via rest API by means of Slave vRO workflow If DR pod exists, then triggering in the same way removing of Firewall Rule in Slave vRO of DR Pod.

triggering Provision/Decommission Firewall Rule CI in CMDB workflow by means of the Master workflow (Master vRO workflow).

updating CMDB updating the Status of the request to SNOW via Rest API by means of the Master Snow Workflow Dispatcher.

According to another feature, the system for managing security, according the invention, is used in a server for managed PaaS (Platform as a service) comprising, in a container-based architecture, at least a processor and memories to save data and executable softwares so as to embed a cloud application software into a fully managed PaaS stack, abstracting complex hybrid Infrastructure as a Service (IaaS) away, said server being characterized in that the SNOW application of the system for managing security represents a first layer of said server, executed on at least a processor and is configured to:

parse and orchestrate a cloud service requested to consume from the cloud service user request to select the cloud computing services and/or resources provided by the cloud service provider and/or a function mode, execute a cloud service operation. and make end to end management in the cloud through dialog with a second layer represented by a Cloud Application integrated software for application transformation and a third layer represented by integrated softwares for infrastructure brokering with the public cloud managed by the integrated software.

According to another feature, the SNOW application is executed on the server for managed PaaS and displayed on a console adapted to the cloud application integrated software by integrating a specific API configured to interface the SNOW (ServiceNow) application language and command to the language and command of the cloud Application integrated software.

According to another feature, the system for managing security according to the invention, is used in an orchestrate Hybrid cloud system wherein a SAP (Systems, Applications and Products for data processing) administration is supported by said security management system for security audit and backup monitoring purpose and provisioning by:

Distribution of SAP monitoring templates by Automatically provisioning of computing resources in virtual environments;

Software Control and Distribution for Distributing of Monitoring agents

Patch Management for providing Regular patching of Monitoring agents

Security Compliancy for satisfying Security compliance according rules, laws and IT Controls System Management for providing System administration task automation, central administration, Inventory, Detailed software inventory for SAP and Used as data source for CMDB.

According to another feature, the SNOW application execution, on a processor of a computing device of the Orchestrated Hybrid cloud, provides an interface for enabling a user to determine any of the following parameters:

time window for support availability time window for incident handling depending on priority time window for change handling Enterprise resource planning (ERP) dialog response time virtual relational database management system (such as Hana) server size physical relational database management system (such as Hana) server size initial and minimal relational database management system (such as Hana) storage size data recovery parameter such as RPO (recovery point objective), or RTO (recovery time objective)

SHORT DESCRIPTION OF THE FIGURES

Other features, details and advantages of the invention will become apparent upon reading the description which follows with reference to the appended figures, which illustrate:

DISCUSSION OF THE INVENTION

The present invention concerns a system for managing security on a cloud management platform portal (CMPP (1)).

Many combinations may be contemplated without departing from the scope of the invention; one skilled in the art will select either one depending on economical, ergonomical, dimensional constraints or others which he/she will have to observe.

Figure 1:
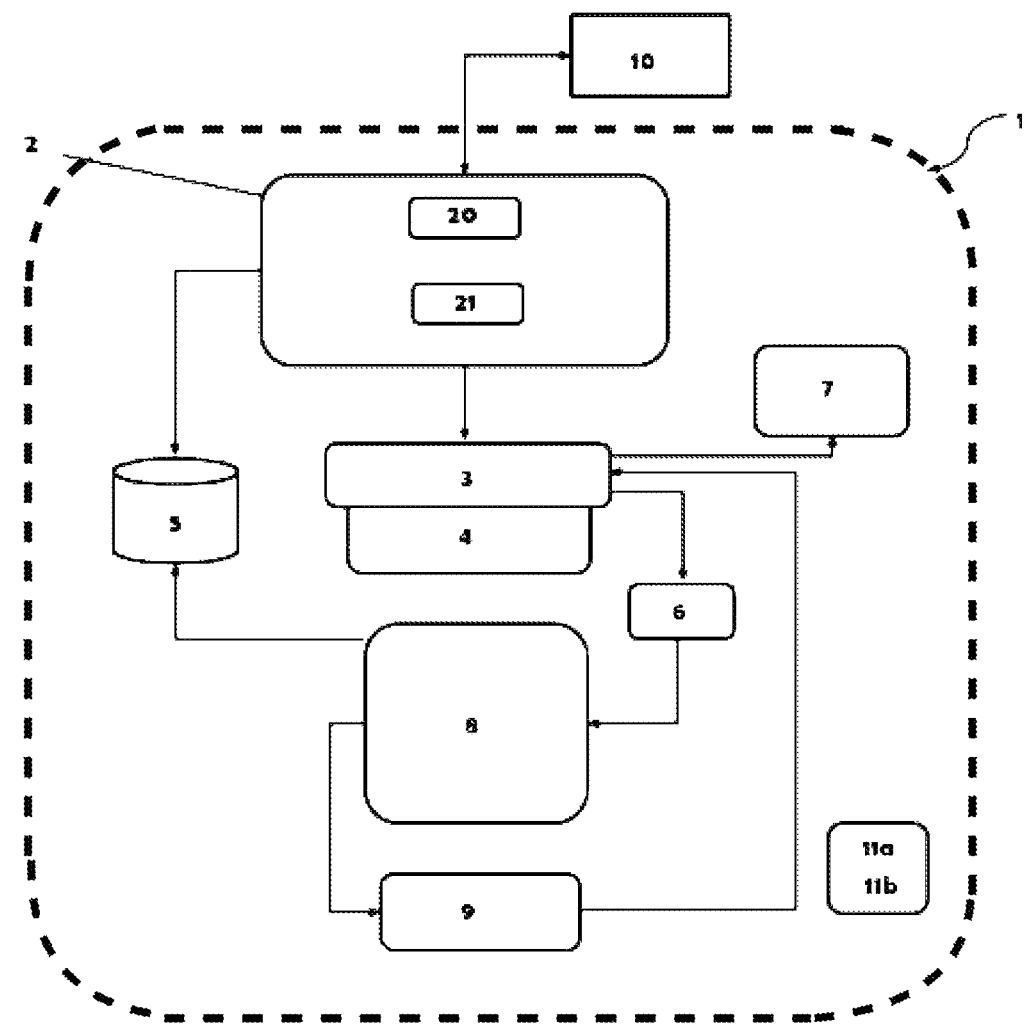
FIG. 1, illustrates a system for managing security on a cloud management platform portal according an embodiment, according one embodiment.

In some embodiments, the system, as illustrated for example in FIG. 1, comprises a set of routines (scripts) which are executed on a computing device or processor allowing the cloud management platform portal to contact a cloud automation service (CAS (4)) by using a REST API (3) (Representational State Transfer Application Programing Interface) to access and configure a set of functionalities of the CAS (4) of the platform hosting services in a portal so as to provision services to a customer, and a ServiceNow (2) (SNOW (2)) application comprising at least one the set of herebelow routines comprising at least one of the following:
  a network Standard Service Request (SSR (20)) to delete a security group (SG);
  a network SSR (20) to create a new Security group;
  a network SSR (20) to modify an existing Security group;
  a network activity SSR (20) to delete a Software-Defined Networking (SDN) Security group rule on hyper-converged platforms (a software-defined IT infrastructure that virtualizes all of the elements of conventional "hardware-defined" systems.);
  a network activity SSR (20) to create a new SDN Security group rule on hyper-converged platforms;
  a network activity SSR (20) to modify an existing SDN (Software defined Networking) Security group rule on hyper-converged platforms;

In some embodiments, the ServiceNow (2) application may also comprises at least one the set of herebelow routines comprising at least one of the following
  a network SSR (20) to remove a virtual machine from a Security group;
  a network SSR (20) to add a virtual machines (VM) to a Security group;

A security group is a container for security group rules. Security groups and security group rules may allow administrators/manager to specify the type of traffic that is allowed to pass through a port. When a virtual machine (VM) is created in a virtual network (VN), a security group can be associated with the VM when it is launched.

The SDN is an approach to networking that separates a control plane from a forwarding plane to support virtualization of computing infrastructures or systems. The ServiceNow (2) (SNOW) application is a Cloud service processing/orchestration module or program or code.

In some embodiments, the system for managing security on a cloud management platform portal (CMPP (1)) comprises a set of routines which execution on a processor provides to the CMPP (1) a set of functionalities and applications comprising at least:
  a ServiceNow (2) (SNOW) application comprising the above set of SSR (20)s for delivering a set of services and comprising a Master Snow Workflow Dispatcher (21) (MSWD);
  a REST API (3) (Representational State Transfer Application Programing Interface);
  A MID (MID Server (6) is a Java application that runs on a server on your local network) server for allowing communication and movement of data between the platform and external applications, data sources, and services or for passing a call to Master vRO (8) dispatcher;
  A Master vRO (8) (vRealize Orchestrator) for automation of workflow processes;
  A slave vRo (9) for automation of workflow processes;
  A set of Security Group Applications (SGA (11B)) for implementing processes related to security group set up;
  A Disaster recovery (DR) Pod application for hosting workloads after disaster occurs in the primary site;
  a cloud Management database (CMDB (5)).
    A Disaster Recovery Pod is an additional infrastructure that may be used to host the workloads after disaster occurs in a primary site.

In some embodiments, the set of applications provided to the CMPP (1) by the execution of the set of routines included in the system for managing security on a cloud management platform portal may comprise a vRA (vRealize Automation) application for automation of cloud services.

In some embodiments, the set of functionalities and applications, provided to the CMPP (1) by the system the system for managing security on a cloud management platform portal (CMPP (1)) through the execution of a set of routines on a processor, may also comprise:
  a set of SDN security group rule applications for implementing processes related to security group rule set up
  a NSX Firewall comprising distributed and edge firewall
  a SSR (20) workflow dispatcher (Master vRO (8) dispatcher)

A distributed firewall is a hypervisor kernel-embedded firewall that provides visibility and control for virtualized workloads and networks. The NSX (7) Distributed firewall is a stateful firewall, meaning it monitors the state of active connections and uses this information to determine which network packets to allow through the firewall. A flow is identified by the following:
  Source address
  Source port
  Destination address
  Destination port
  Protocol Distributed firewall can help in creating identity-based rules as well. Administrators can enforce access control based on the user's group membership as defined in the enterprise Active Directory. For example, and without limitation, some scenarios where identity-based firewall rules can be used are:
  User accessing virtual applications using a laptop or mobile device where AD is used for user authentication
  User accessing virtual applications using Virtual Desktop Infrastructure (VDI) where the virtual machines are Microsoft Windows-based Edge Firewall monitors the North-South traffic to provide perimeter security functionality including firewall, Network Address Translation (NAT), and site-to-site IPSec and SSL VPN functionality. This solution is available in the virtual machine form factor and can be deployed in a High Availability mode.

The invention also concerns a method for managing security group on a cloud management platform portal.

Figure 2:
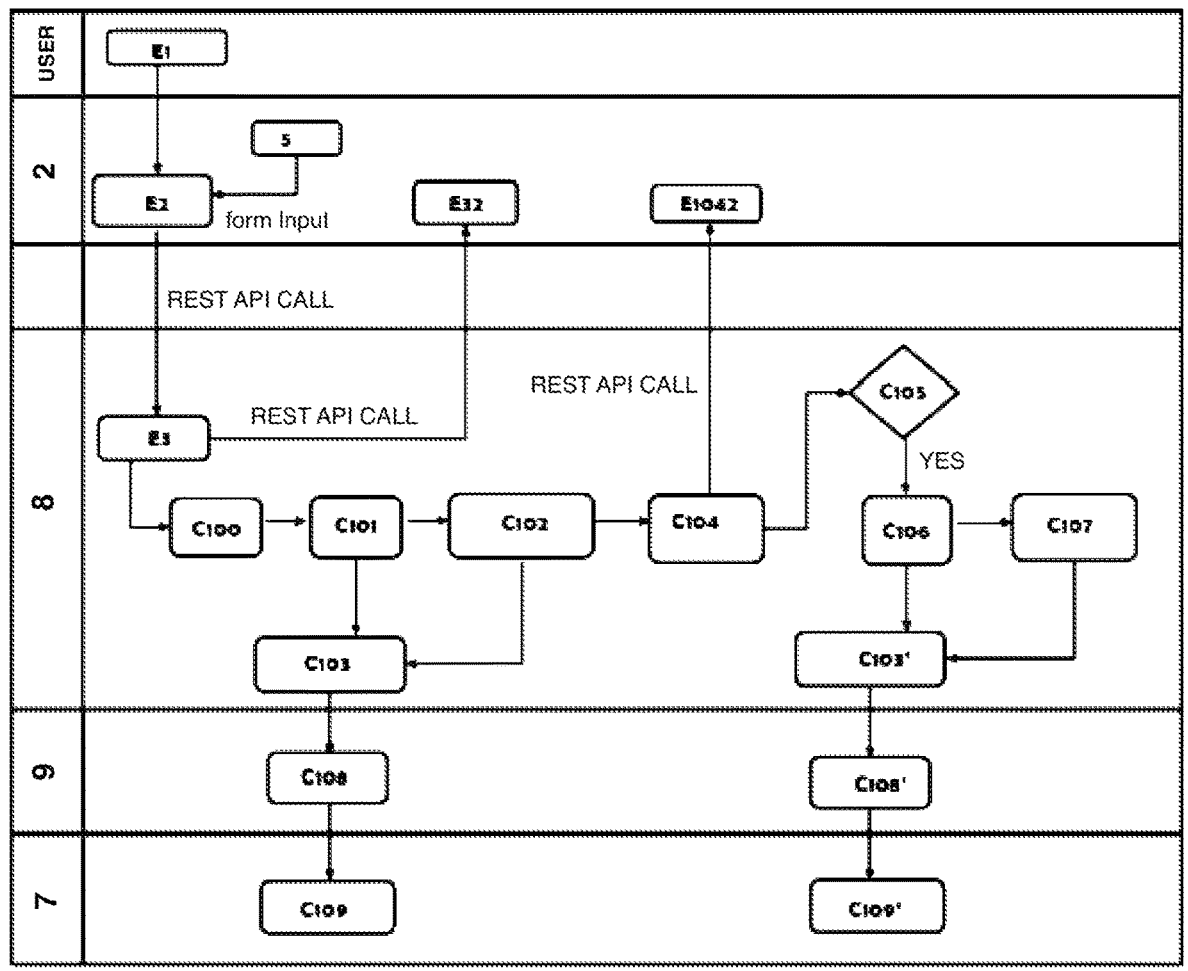
FIG. 2, illustrates the process for creating a security group (SG), according one embodiment.

In some embodiments, the process for managing a security group on a cloud management platform portal, as described above, the system comprising a set of software codes executed on a processor the platform to implement the process for managing a security group, said process being characterized in that it comprises at least one of the following:
  Creating a security group (SG)
  Modifying an existing security group
  Deleting a security group
  Adding server to a security group
  Removing a virtual server to a security group
  Configuring a SDN security group rule In some embodiments, a set of software codes is executed on the platform for creating a security group (SG), said creating a security group process comprising, as illustrated on FIG. 2:
  Inviting (E1) a user to fill in a form and submit it (E2) in ServiceNow (2) through an interactive interface (10) of the CMPP (1);
  Calling a REST API (3) call
  passing the call (E3) to Master vRO (8) dispatcher by means of the MID Server (6). Passing the call (E3) may comprise triggering the Master vRO (8) SSR workflow or Master vRO (8) dispatcher dispatcher or SSR workflow dispatcher.
  calling (C100) a SSR (20) "Create a Security group workflow" by means of the Master vRO (8) dispatcher controlling the Master worflows
  triggering (C101) a "Create Security group wrapper" by means of a Master workflow. In another embodiment, an "APPLYON_Create Security Group Wrapper" step (C102) is triggered. When the "Create Security group wrapper" step (C101 or C102) is executed, a Multi-node execution of workflows (C103, C103') may be launched.
  triggering (C108, C108') a remote workflow on slave vRo (9) by means of the Security Group Wrapper
  updating data (C109, C109') on a NSX firewall via REST API (3) by means of the Slave vRo (9) workflow
  triggering (C104) Provision Security Group Configuration Item in CMDB (5) workflow by means of the Master workflow
  triggering (E1042) Modify Name of Security Group belonging to the "Modify SG" SSR (20) with Sys_id Wrapper (which is returned by CMDB (5)) workflow by means of the Master vRO (8) workflow.
  Modifying Name and description of Security Group via REST API (3) by means of the Slave vRo (9) workflow
  If DR Pod (11a) exists (C105), then triggering in the same way creation of Security Group (C109') in Slave vRo (9) of DR Pod (11a) (steps C106, C107)
  updating (E32) the status of the request to SNOW via REST API (3) by means of the Master Snow Workflow Dispatcher (21).

Figure 3:
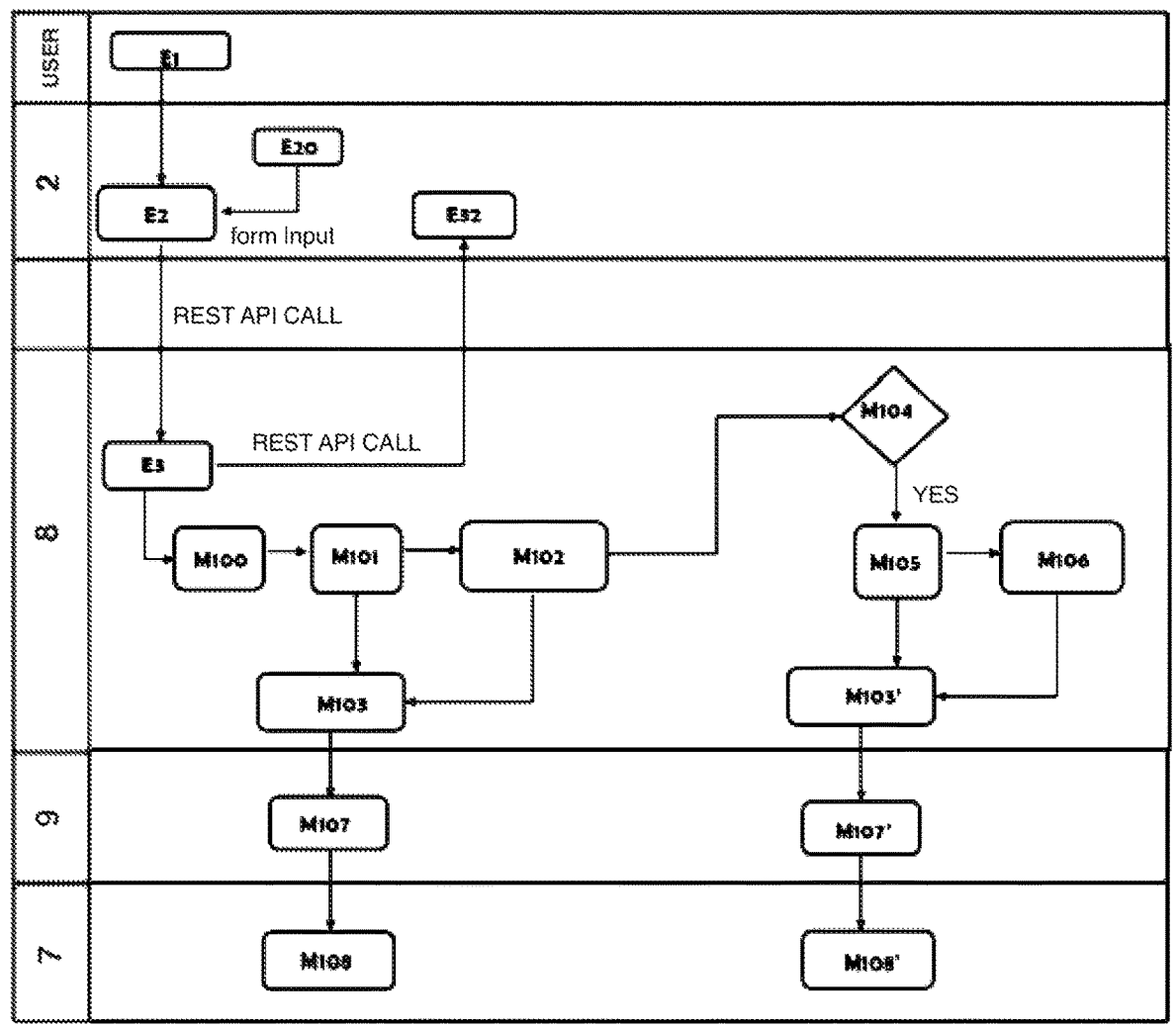
FIG. 3 illustrates the process for modifying a security group (SG), according one embodiment.

In some embodiments, a set of software codes is executed on the platform for modifying an existing security group, said modifying an existing security group process comprising, as illustrated on FIG. 3:
  Inviting (E1) a user to fill in a form and submit it (E2) in ServiceNow (2) through an interactive interface of the CMPP (1)
  Calling a REST API (3) call
  passing (E3) the call to Master vRO (8) dispatcher by means of the MID Server (6)
  calling (M100) a SSR (20) "Modifying a security group workflow" by means of the Master vRO (8) dispatcher triggering (M101) Modify a Security group wrapper by means of the Master workflow. In another embodiment, a "APPLYON_Modify Security Group Wrapper" step (M102) is triggered. When the "Modify Security group wrapper" step (M101 or M102) is executed, a Multi-node execution of workflows (M103, M103') may be launched.
  triggering (M107, M107') remote workflow on slave vRo (9) by means of the security group Wrapper
  updating (M108, 108') data on a NSX firewall by means of Slave vRo (9) workflow via REST API (3)
  If DR Pod (11a) exists (M104), then triggering the same way, modification of Security Group in Slave vRo (9) of DR Pod (11a) (M105, M106)
  updating (E32) the Status of the request to SNOW by means of the Snow Workflow Dispatcher (MSWD) via REST API (3)

Figure 4:
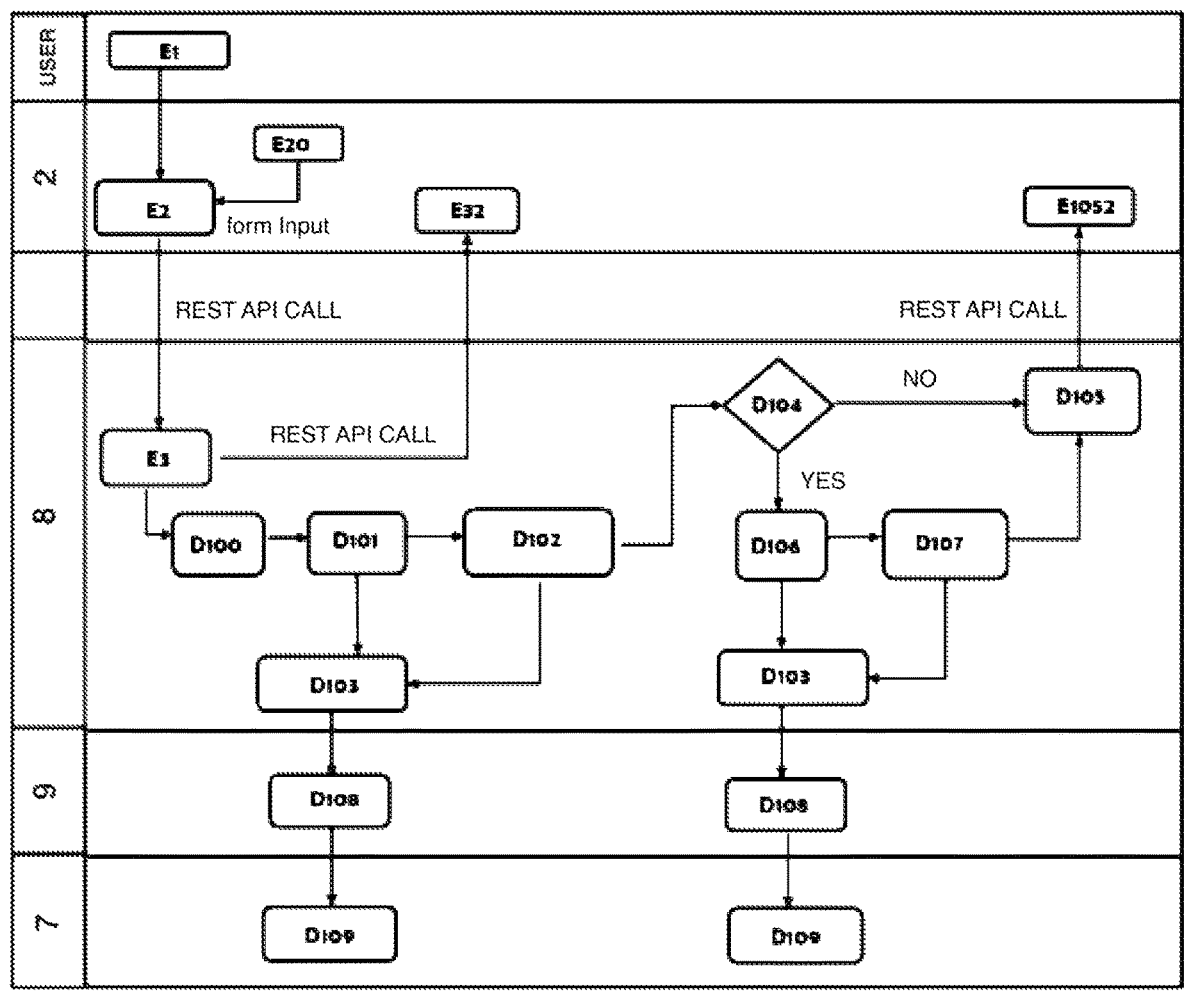
FIG. 4 illustrates the process for deleting a security group (SG), according an embodiment.

In some embodiments, a set of software codes is executed on the platform for deleting a security group, said deleting a security group process comprising as illustrated on FIG. 4:
  Inviting (E1) a user to fill in a form and submit it (E2) in ServiceNow (2) through an interactive interface of the CMPP (1)
  Calling a REST API (3) call
  passing (E3) the call to Master vRO (8) dispatcher by means of the MID Server (6)
  calling (D100) a SSR (20) "deleting a security group workflow" by means of the Master vRO (8) dispatcher
  triggering (D101) Delete Security group wrapper by means of the Master workflow. When the "Delete Security group wrapper" step (D101 or D102) is executed, a Multi-node execution of workflows (D103, D103') may be launched.
  triggering (D108) remote workflow on slave vRo (9) by means of the delete Security Group Wrapper
  updating (D109) data on NSX by means of the Slave vRo (9) workflow via REST API (3)
  In another embodiment, after calling (D100) the SSSR (20) "deleting a security group workflow", triggering (D102) for "APPLY_ON SG Delete Security group wrapper" by means Master workflow.
    triggering (D108) remote workflow on slave vRo (9) by means of Delete Security group wrapper
    updating (D109) data on NSX by means of the Slave vRo (9) workflow via REST API (3)
  If DR Pod (11a) exists (D104), then triggering (D106 or D107, D103', D108' and D109') in the same way removing of Security Groups in Slave vRo (9) of DR Pod (11a)
  Triggering (D105) Provision Security Group Configuration Items in CMDB (5) workflow by means of the Master workflow (f DR Pod (11a) does not exist)
  updating (E1052) CMDB (5) security group Configuration Items by means of Provision Security Group CI in CMDB (5) workflow via Snow REST API (3)
  updating (E32) the Status of the request to SNOW by means of the Snow Workflow Dispatcher via REST API (3).

In some embodiments, a set of software codes is executed on the platform for adding server to a security group (not illustrated in the present invention), said adding server to a security group process comprising:
  1) Inviting a user to fill in a form and submit it in ServiceNow (2) through an interactive interface of the CMPP (1)
  2) Calling a REST API (3) call
  3) passing the call to Master vRO (8) dispatcher by means of the MID Server (6)

Figure 5:
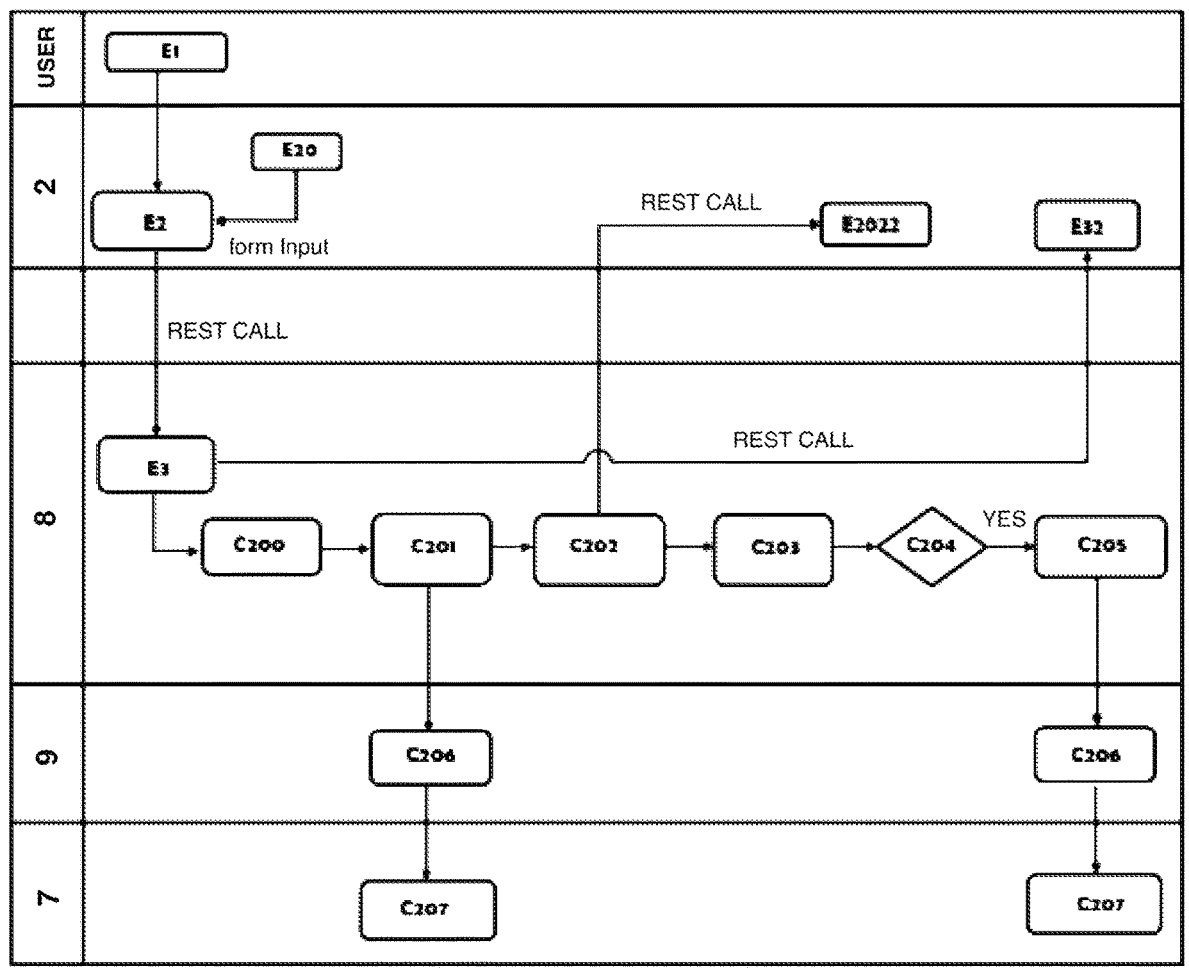
FIG. 5 illustrates the process for creating a Software-Defined Networking (SDN) security group rule, according an embodiment.

4) triggering SSR (20) Workflow Dispatcher with at least one of input (or all of the inputs?) it gets from resource oneIaasConfig.json
   WorfklowID (Friendly name of the vRO workflow to be executed)
   Json (containing Parameters with input parameter for workflow to be executed)
   RITMID (identifier of the request in SNOW that will be updated with status by SSR (20) Workflow dispatcher)
5) triggering a SSR (20) "ADD Virtual Machine" (AVM) to Security Group Workflow by means of the SSR (20) Workflow Dispatcher Workflow
6) checking DPC Version and calling "Add Virtual Machine functionality" to Security Group Wrapper Workflow by means of the SSR (20) "ADD Virtual Machine to Security Group Workflow" and then calling a "Multi-Node Execute workflow" by means of the Security Group Wrapper.
7) Triggering the "Add Virtual Machine" to "Security Group workflow" in the remote vRO by means of the Multi-Node Execute workflow.
8) checking two conditions in a vRA (vRealize Automation):
   if Pod is DR Enabled and
   if VM is part of a DR Security Group, by means of SSR (20) (IIAAS206a) ADD VM to Security Group Workflow from Master vRO (8) and:
   If both conditions are met, DR IP address is taken from vRA for selected VM and Add VM to Security Group Wrapper is triggered again the DR Pod (11*a*) (step 7)
   If any of the conditions is not met workflow jumps to the next step 9
9) updating CMDB (5) gets through REST call
10) updating the Request status by SSR (20) workflow dispatcher through REST call In some embodiments, a set of software codes is executed on the platform for removing a virtual server to a security group (not illustrated in the present invention) and, said removing a virtual server to a security group comprising for the following steps:
1) Inviting a user to fill in a form and submit it in ServiceNow (2) through an interactive interface of the CMPP (1);
2) creating REST API (3) call and putting it in ServiceNow (2) ECC queue
3) making a periodical SOAP call to ServiceNow (2) to retrieve REST API (3) call by means of the MID Server (6)
4) passing REST API (3) Call, by means of the MID Server (6), to Master vRO (8) to call a SSR (20) (IIAAS206b) Remove virtual server Workflow
5) triggering SSR (20) Workflow Dispatcher with following inputs
   WorfklowID (Friendly name of the vRO workflow to be execute)
   Json (containing Parameters with input parameter for workflow to be executed)
   RITMID (identifier of the request in SNOW that will be updated with status by SSR (20) Workflow dispatcher workflow)
6) triggering the SSR (20) (IIAAS206b) Remove virtual server Workflow passing all input parameters by means of the SSR (20) Workflow Dispatcher
7) preparing, by means of the SSR (20) (IIAAS206b) "Remove virtual server Workflow", Properties basing on the input parameters that will be assigned to VCAC (vCloud Administrator Center) Virtual Machine
8) checking DPC Version and calling the Remove VM from Security Wrapper workflow by means of the SSR (20) (IIAAS206b) Remove virtual server Workflow and then calling the multi-node workflow by using the Remove VM from Security Wrapper and the Remove VM from Security in the remote vRO gets executed
9) removing IPSet object from NSX Security Group by means of Slave workflow
10) Removing Virtual Machine from a Security Group Workflow from Master vRO (8), checking in vRA if Pod is DR Enabled and if Virtual Machine is part of a DR Security Group by using SSR (20) (IIAAS206b) Remove virtual server Workflow:
    If both conditions are met, DR IP address is taken from vRA for selected VM and "Remove VM" from Security Group Wrapper is triggered again in the DR Pod (11*a*) (step 8)
    If any of the conditions is not met workflow jumps to the next step 10
11) updating CMDB (5) through REST call and removing VM is from the Security Group
12) updating the Request status by SSR (20) workflow dispatcher through REST call In some embodiments, a set of software codes is executed on the platform for configuring a SDN security group rule, said configuring a SDN security group rule process comprising at least one of the sub-steps:
   Creating a SDN security group rule
   Modifying a SDN security group rule
   Deleting SDN security group rule In some embodiments, a set of software codes is executed on the platform for creating a SDN security group rule, said creating a SDN security group rule comprising, as illustrated on FIG. 5:
   Inviting (E1) a user to fill in a form and submit it (E2) in ServiceNow (2) through an interactive interface of the CMPP (1)
   passing the call to Master vRO (8) dispatcher by means of the MID Server (6)
   triggering (E3) SNOW Workflow Dispatcher with following input
      WorfklowID (Friendly name of the vRO workflow to be executed)
      Json (containing Parameters with input parameter for workflow to be executed)
      RITMID (identifier of the request in SNOW that will be updated with status by SNOW Workflow dispatcher workflow)
   triggering (C200) a SSR (20) (1AAS310a) "create SDN security group rule" Workflow passing all input parameters by means of the SNOW Workflow Dispatcher
   calling (C201) Create NSX Firewall Rule Wrapper workflow
   creating (C206) Inputs for the Create NSX Firewall Rule workflow and passing them through to the workflow via the Multi-Node Execute workflow wrapper
   creating (C207) an NSX Firewall Rule under a new or existing Firewall section within the Create NSX Firewall Rule workflow on the slave POD
   executing (C202) the Provision Firewall Rule CI in SNOW CMDB (5) workflow to keep CMDB (5) up to date at return to the main ACCP (Atos cloud control platform) workflow after successful Firewall rule creation executing (C2022) Modify NSX Firewall Rule Wrapper workflow to rename new firewall rule name with identity of database CMDB (5) id executing (C204) Disaster recovery (DR) Enabled entry check calling (C205) DR Create NSX Firewall Rule Wrapper workflow creating (C206) Inputs for the DR Create NSX Firewall Rule Wrapper workflow and passing them through to the workflow via a Multi-Node Execute workflow wrapper.

Figure 6:
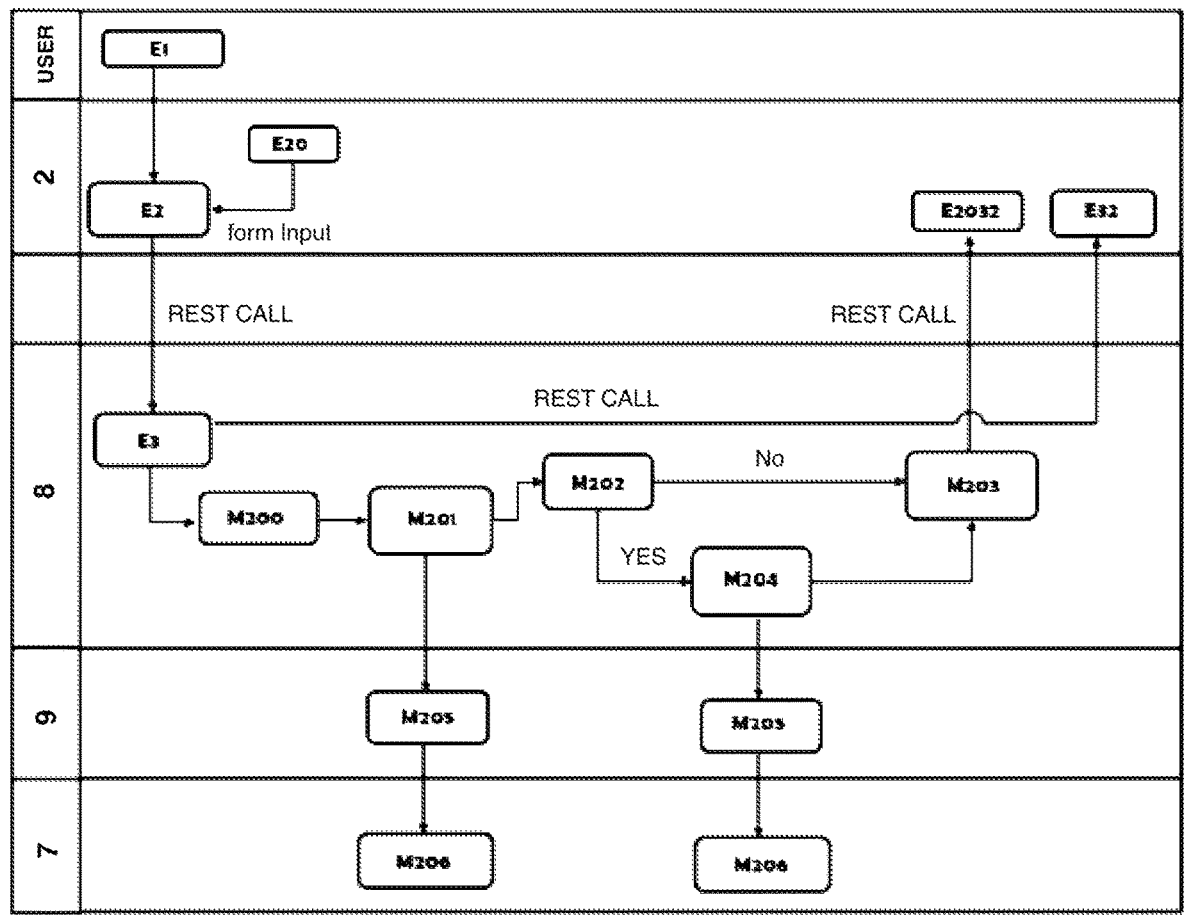
FIG. 6 illustrates the process for modifying a Software-Defined Networking (SDN) security group rule, according an embodiment.

In some embodiments, a set of software codes is executed on the platform for modifying a SDN security group rule, said modifying a SDN security group rule process comprising, as illustrated on FIG. 6:

Inviting (E1) a user to fill in a form and submit it (E2) in ServiceNow (2) through an interactive interface of the CMPP (1)

passing the call to Master vRO (8) dispatcher by means of the MID Server (6)

triggering (E3) SNOW Workflow Dispatcher with following input
WorfklowID (Friendly name of the Master vRO (8) workflow to be executed)
Json (containing Parameters with input parameter for workflow to be executed)
RITMID (identifier of the request in SNOW that will be updated with status by SNOW Workflow dispatcher workflow)

Triggering (M200) a SSR (20) "Modify SDN security group rule Workflow" passing all input parameters by means of the SNOW Workflow Dispatcher calling (M201) the Modify NSX Firewall Rule Wrapper workflow creating (M205) Inputs for the Modify NSX Firewall (FW) Rule workflow and passing them through to the workflow via a Multi-Node Execute workflow wrapper modifying (M206) an NSX Firewall Rule under an existing Firewall section within the Modify NSX Firewall Rule workflow on the slave POD, checking (M202) whether DR Pod (11a) and DR Location information was sent from snow at the return to the main ACCP workflow after a successful FW rule modification, If yes calling (M204) the same wrapper workflow for DR Pod (11a) and making same modifications to DR Firewall Rule, the Firewall Rule on DR site being searched by name+DR suffix.

If no, executing (M203) Provision Firewall Rule CI in SNOW CMDB (5) workflow to keep CMDB (5) up to date (E2032)

Updating (E32) the Status of the request to SNOW via REST API (3) by means of the Snow Workflow Dispatcher.

Figure 7:
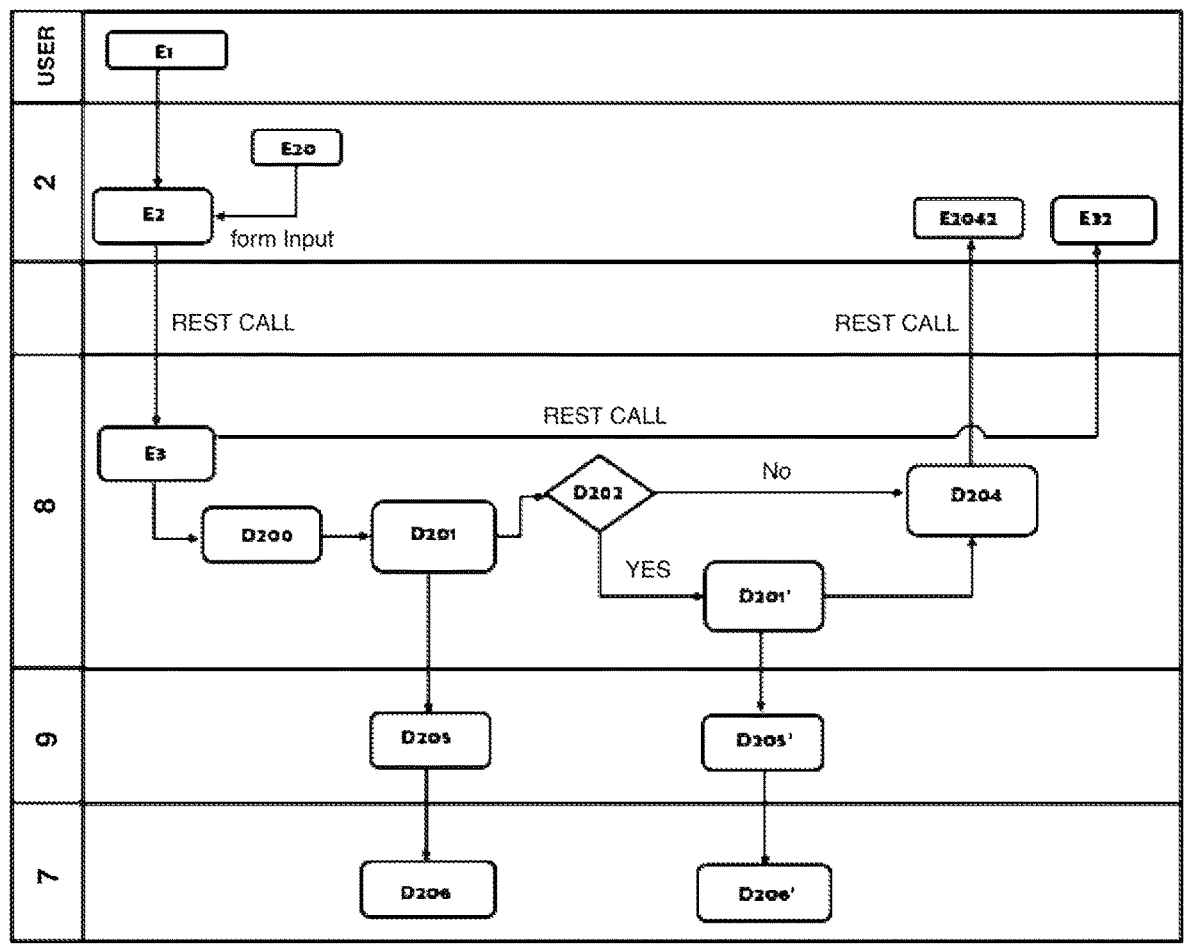
FIG. 7 illustrates the process for deleting a Software-Defined Networking (SDN) security group rule, according an embodiment.

In some embodiments, a set of software codes is executed on the platform for deleting SDN security group rule, said deleting SDN security group rule process comprising, as illustrated on FIG. 7:

Inviting (E1) a user to fill in a form and submit it (E2) in ServiceNow (2) through an interactive interface of the CMPP (1)

calling REST API (3) call passing (E3) the call to Master vRO (8) dispatcher by means of the MID Server (6)

calling (D200) SSR (20) Delete SDN Security group Rule workflow by dispatcher triggering (D201) Delete NSX Firewall Rule wrapper by means of the Master workflow triggering (D205) remote workflow on slave vRo (9) by means of the NSX Firewall Rule wrapper updating (D206) data on NSX via REST API (3) by means of Slave vRo (9) workflow If DR Pod (11a) exists (D202), then triggering (D201', D205' and D206' respectively) in the same way removing of Firewall Rule in Slave vRo (9) of DR Pod (11a).

triggering (D204) Provision/Decommission Firewall Rule CI in CMDB (5) workflow by means of the Master workflow (Master vRO (8) workflow).

updating (E2042) CMDB (5)

updating (E32) the Status of the request to SNOW via REST API (3) by means of the Master Snow Workflow Dispatcher (21).

In some embodiments, the system for managing security, as described in the present application, may be used in a server for managed PaaS (Platform as a service) comprising, in a container-based architecture, at least a processor and memories to save data and executable softwares so as to embed a cloud application software into a fully managed PaaS stack, abstracting complex hybrid Infrastructure as a Service (IaaS) away. The SNOW application of the system for managing security may represent a first layer of said server for managed PaaS, executed on at least a processor and configured to:

parse and orchestrate a cloud service requested to consume from the cloud service user request, to select the cloud computing services and/or resources provided by the cloud service provider and/or a function mode, execute a cloud service operation and make end to end management in the cloud through dialog
with a second layer represented by a Cloud Application (for example, and without limitation, Apprenda) integrated software for application transformation and
a third layer represented by other integrated softwares for infrastructure brokering with a public cloud (for example and without limitation Amazon Web Services (AWS)) managed by the integrated softwares.

In some embodiments, the SNOW application is executed on the server for managed PaaS and displayed on a console adapted to the cloud application integrated software (Apprenda) by integrating a specific API configured to interface the SNOW (ServiceNow (2)) application language and command to the language and command of the cloud Application integrated software (Apprenda).

In some embodiments, the system for managing security, as described in the present application, may be used in an orchestrate Hybrid cloud system wherein a SAP (Systems, Applications and Products for data processing) administration is supported by said security management system for security audit and backup monitoring purpose and provisioning by:

distribution of SAP monitoring templates by automatically provisioning of computing resources in virtual environments;

software control and distribution for distributing of monitoring agents;

patch management for providing regular patching of monitoring agents security compliancy for satisfying security compliance according rules, laws and IT Controls system management for providing system administration task automation, central administration, Inventory, detailed software inventory for SAP and used as data source for CMDB (5) (Cloud management database).

In some embodiments, the SNOW application execution, of the system for managing security used in the Orchestrated Hybrid Cloud system, on a processor of a computing device of the Orchestrated Hybrid cloud system, provides an interface for enabling a user to determine any of the following parameters:

time window for support availability
time window for incident handling depending on priority
time window for change handling
Enterprise resource planning (ERP) dialog response time
virtual relational database management system (such as Hana) server size
physical relational database management system (such as Hana) server size
initial and minimal relational database management system (such as Hana) storage size
data recovery parameter such as RPO (recovery point objective), or RTO (recovery time objective)

It should be understood that the enumeration of the steps of any process described in the present application does not represent the sequential order of the steps in which the process should be executed but could be modified by executing a step before others. The sequential order could be modified by the man skilled in the art.

It will be easily understood upon reading the present application that the particularities of the present invention, as generally described and illustrated in the figures, may be arranged and designed according to a great variety of different configurations. Thus, the description of the present invention and the related figures are not provided for limiting the scope of the invention but simply illustrating selected embodiments.

One skilled in the art will understand that the technical features of a given embodiment may in fact be combined with features of another embodiment unless the opposite is explicitly mentioned or if it is obvious that these features are incompatible. Further, the technical features described in a given embodiment may be isolated from the other features of this embodiment unless the opposite is explicitly mentioned.

It should be obvious for persons skilled in the art that the present invention allows embodiments under many other specific forms without departing from the field defined by the scope of the appended claims, these embodiments should be considered as an illustration and the invention should not be limited to the details given above.

What is claimed is:

1. A system for managing security on a cloud management platform portal, the system comprising:
    a set of routines which are executed on a computing device or processor configured to allow the cloud management platform portal to contact a cloud automation service (CAS) by using a Representational State Transfer Application Programing Interface (REST API) to access and configure a set of functionalities of the CAS of a platform hosting services in a portal to provision services to a customer; and
    a ServiceNow (SNOW) application comprising a plurality of routines to manage virtual machines using the cloud management platform portal and to provision services via said cloud automation service, said plurality of routines comprising at least one network Standard Service Request (SSR) configured to
    delete a security group,
    create a new security group,
    modify an existing security group,
    delete a Software-Defined Networking (SDN) security group rule on hyper-converged platforms,
    create a new SDN security group rule on hyper-converged platforms, and
    modify an existing SDN security group rule on hyper-converged platforms;
    wherein the system is in a server for managed platform as a service (PaaS), wherein said server comprises, in a container-based architecture,
        at least a processor and memories to save data and executable software in order to embed a cloud application software into a fully managed PaaS stack, abstracting complex hybrid Infrastructure as a Service (IaaS) away,
        wherein said server is configured such that the SNOW application represents a first layer of said server,
        wherein said server is executed on said processor and is configured to
            parse and orchestrate a cloud service requested to consume from the cloud service a user request,
            select one or more of cloud computing services and resources provided by one or more of a cloud service provider and a function mode,
            execute a cloud service operation and make end to end management in a cloud through dialog
                with a second layer of said server represented by a cloud application integrated software for application transformation and
                a third layer of said server represented by integrated software for infrastructure brokering with a public cloud managed by the integrated software;
    wherein the SNOW application is executed on the server for managed platform as a service (PaaS) and displayed on a console adapted to the cloud application integrated software by integrating a specific API configured to interface a language of the SNOW application and command to the language and command of the cloud application integrated software.

2. The system for managing security on a cloud management platform portal according to claim 1, wherein said set of routines executing on said computing device or processor provides a set of functionalities and applications to the cloud management platform portal, said set of functionalities and applications comprising
    the SNOW application comprising the at least one SSR to deliver a set of services and further comprising a Master Snow Workflow Dispatcher (MSWD);
    said REST API,
    a MID server comprising a Java application that runs on a server on a local network, wherein said MID server allows communication and movement of data between the platform and external applications, data sources, and services or for passing a call to a Master Virtual Realty Orchestrator (VRO) dispatcher,
    said Master VRO that automates workflow processes,
    a slave VRO that automates workflow processes,
    a set of Security Group Applications (SGA) that implement processes related to security group set up, a disaster recovery (DR) Pod application that hosts workloads after disaster occurs in a primary site,
a cloud Management database (CMDB).

3. The system for managing security on a cloud management platform portal according to claim 1, wherein the set of functionalities and applications further comprise
a set of SDN security group rule applications for implementing processes related to security group rule set up,
a NSX firewall comprising distributed and edge firewall,
a workflow dispatcher for said at least one SSR.

4. The system for managing security on a cloud management platform portal, according to claim 1, wherein the system is in an orchestrated hybrid cloud system wherein a System Applications and Products for data processing (SAP) administration is supported by said system for security audit and backup monitoring purposes and provisioning by
distribution of SAP monitoring templates by automatically provisioning of computing resources in virtual environments,
software control and distribution for distributing monitoring agents,
patch management for providing regular patching of monitoring agents,
security compliancy for satisfying security compliance according to rules, laws and information technology controls,
system management for providing system administration task automation, central administration inventory, detailed software inventory for SAP and used as a data source for a cloud Management database (CMDB).

5. The system for managing security on a cloud management platform portal according to claim 4, wherein in the orchestrated hybrid cloud system, executing the SNOW application on said processor provides an interface for enabling a user to determine one or more of
a time window for support availability,
a time window for incident handling depending on priority,
a time window for change handling,
an enterprise resource planning (ERP) dialog response time,
a virtual relational database management system server size,
a physical relational database management system server size,
an initial and minimal relational database management system storage size,
a data recovery parameter such as a recovery point objective (RPO) or a recovery time objective (RTO).

6. A process for managing a security group on a cloud management platform portal by means of a system for managing security according to claim 1, the system comprising a set of software codes executed on a processor of the cloud management platform portal to implement the process for managing a security group, said system further comprising
a set of routines which are executed on a computing device or said processor allowing the cloud management platform portal to contact a cloud automation service (CAS) by using a Representational State Transfer Application Programing Interface (REST API) to access and configure a set of functionalities of the CAS of a platform hosting services in a portal to provision services to a customer; and a ServiceNow (SNOW) application comprising a plurality of routines to manage virtual machines using the cloud management platform portal, said plurality of routines comprising
at least one network Standard Service Request (SSR) configured to
delete a security group,
create a new security group, and
modify an existing security group; and
at least one other network Standard Service Request (SSR) configured to
delete a Software-Defined Networking (SDN) security group rule on hyper-converged platforms,
create a new SDN security group rule on hyper-converged platforms,
modify an existing Software defined Networking (DNS) security group rule on hyper-converged platforms;
wherein the system is in a server for managed platform as a service (PaaS), wherein said server comprises, in a container-based architecture,
at least a processor and memories to save data and executable software in order to embed a cloud application software into a fully managed PaaS stack, abstracting complex hybrid Infrastructure as a Service (IaaS) away,
wherein said server is configured such that the SNOW application represents a first layer of said server,
wherein said server is executed on said processor and is configured to
parse and orchestrate a cloud service requested to consume from the cloud service a user request,
select one or more of cloud computing services and resources provided by one or more of a cloud service provider and a function mode,
execute a cloud service operation and make end to end management in a cloud through dialog
with a second layer of said server represented by a cloud application integrated software for application transformation and
a third layer of said server represented by integrated software for infrastructure brokering with a public cloud managed by the integrated software;
wherein said process comprises
creating a security group (SG);
modifying an existing security group;
deleting a security group;
adding server to a security group;
removing a virtual server to a security group; and,
configuring a SDN security group rule;
wherein the SNOW application is executed on the server for managed platform as a service (PaaS) and displayed on a console adapted to the cloud application integrated software by integrating a specific API configured to interface a language of the SNOW application and command to the language and command of the cloud application integrated software.

7. The process for managing security group on a cloud management platform portal according to claim 6, wherein said creating said security group comprises
inviting a user to fill in a form and submit said form in SNOW through an interactive interface of said cloud management platform portal;
calling a REST API call;
passing the REST API call to Master VRO dispatcher by means of a MID server;

calling said at least one SSR "Create a Security group workflow" by means of the Master VRO dispatcher controlling a master workflow;

triggering a "Create Security Group Wrapper" by means of said master workflow;

triggering a remote workflow on slave VRO by means of the security group wrapper;

updating data on a NSX firewall via said REST API by means of the workflow on said Slave VRO;

triggering Provision Security Group Configuration Item in a cloud Management database (CMDB) workflow by means of the Master workflow;

triggering Modify Name of Security Group belonging to the at least one SSR configured to modify the existing security group with Sys id Wrapper, which is returned by said CMDB workflow by means of the Master VRO;

modifying same Name and description of said Security Group via REST API by means of the workflow on said Slave VRO;

if a disaster recovery (DR) Pod exists, then triggering in a same way creation of said Security Group in said Slave VRO of said DR Pod;

updating a status of a request to said SNOW via said REST API by means of a Master SNOW Workflow Dispatcher.

8. The process for managing security group on a cloud management platform portal according to claim 7, wherein a set of software codes is executed on the cloud management platform portal for modifying said existing security group, wherein said modifying said existing security group comprises inviting said user to fill in said form and submit the form in SNOW through the interactive interface of said cloud management platform portal;

calling a REST API call;

passing the REST API call to said Master VRO dispatcher by means of the MID server;

calling said at least one SST "Modifying a security group workflow" by means of the Master VRO dispatcher;

triggering a Modify a Security group wrapper by means of the Master workflow;

triggering said remote workflow on said slave VRO by means of the security group Wrapper;

updating said data on a NSX firewall by means of said workflow on said Slave VRO via said REST API;

if said DR Pod exists, then triggering in the same way, modification of said Security Group in Slave VRO of said DR Pod;

updating a status of a request to said SNOW by means of the Master Snow Workflow Dispatcher via said REST API.

9. The process for managing security group on a cloud management platform portal according to claim 7, wherein a set of software codes is executed on the cloud management platform portal for deleting a security group, wherein said deleting of said security group comprises inviting said user to fill in said form and submit said form in SNOW through said interactive interface of the cloud management platform portal; calling a REST API call;

passing the REST API call to said Master VRO dispatcher by means of the MID server;

calling said at least one SSR "deleting a security group workflow" "y means of the Master VRO dispatcher;

triggering a Delete Security group wrapper by means of the Master workflow or triggering "A "PLY ON"" G Delete Security group wrapper by means of said Master workflow;

triggering said remote workflow on said slave VRO by means of the delete Security Group Wrapper;

updating said data on a NSX firewall by means of the workflow on said Slave VRO via said REST API;

if said DR Pod exists, then triggering, in a same way, removing of said Security Groups in said Slave VRO of said DR Pod;

triggering Provision Security Group Configuration Items in said CMDB workflow by means of the Master workflow, if said DR Pod does not exist;

updating said CMDB security group Configuration Items by means of Provision Security Group Configuration Items in said CMDB workflow via said REST API;

updating a status of a request to said SNOW by means of the Master SNOW Workflow Dispatcher via said REST API.

10. The process for managing security group on a cloud management platform portal according to claim 7, wherein a set of software codes is executed on the cloud management platform portal for configuring a SDN security group rule, wherein said configuring said SDN security group rule comprises at least one of creating said SDN security group rule;

modifying said SDN security group rule;

deleting said SDN security group rule.

11. The process for managing security group on a cloud management platform portal according to claim 10, wherein a set of software codes is executed on the cloud management platform portal for said creating said SDN security group rule, wherein said creating said SDN security group rule comprises inviting said user to fill in said form and submit said form in said SNOW through said interactive interface of the cloud management platform portal; passing the call to said Master VRO dispatcher by means of the MID server;

triggering said Master SNOW Workflow Dispatcher with
a WorfklowID comprising a friendly name of the VRO workflow to be executed,
a Json comprising parameters an input parameter for workflow to be executed,
a RITMID comprising an identifier of a request in said SNOW that will be updated with a status by said Master SNOW workflow dispatcher;

triggering said at least one SSR with "create SDN security group rule" workflow passing all of said parameters by means of the Master SNOW workflow dispatcher;

calling a Create NSX Firewall Rule Wrapper workflow;

creating inputs for the Create NSX Firewall Rule Wrapper workflow and passing said inputs through to the workflow via a Multi-Node Execute workflow wrapper;

creating an NSX Firewall Rule under a new or existing firewall section within the Create NSX Firewall Rule Wrapper workflow on the slave VRO of said DR Pod;

executing a Provision Firewall Rule Configuration Items in said SNOW CMDB workflow to keep said CMDB up to date at return to a main cloud control platform workflow after successful creation of said NSX Firewall Rule;

executing a Modify NSX Firewall Rule Wrapper workflow to rename a new firewall rule name with identity of database CMDB id;
executing a Disaster recovery (DR) Enabled entry check;
calling a DR Create NSX Firewall Rule Wrapper workflow;
creating inputs for the DR Create NSX Firewall Rule Wrapper workflow and passing said inputs through to the workflow via a Multi-Node Execute workflow wrapper.

12. The process for managing security group on a cloud management platform portal according to claim 8, wherein a set of software codes is executed on the cloud management platform portal for modifying a SDN security group rule, wherein said modifying said SDN security group rule comprises
inviting said user to fill in said form and submit said form in said SNOW through said interactive interface of the cloud management platform portal; passing the call to the Master VRO dispatcher by means of the MID server;
triggering said Master SNOW Workflow Dispatcher with
a WorfklowID comprising a friendly name of the VRO workflow to be executed,
a Json comprising parameters with an input parameter for workflow to be executed,
a RITMID comprising an identifier of a request in said SNOW that will be updated with a status by said Master SNOW workflow dispatcher workflow;
triggering said at least one SSR with a "Modify SDN security group rule Workflow" passing all of said parameters by means of the Master SNOW Workflow Dispatcher;
calling a Modify NSX Firewall Rule Wrapper workflow;
creating inputs for the Modify NSX Firewall Rule workflow and passing the inputs to the workflow via a Multi-Node Execute workflow wrapper
modifying an NSX Firewall Rule under an existing Firewall section within the Modify NSX Firewall Rule workflow on the slave VRO of said DR Pod;
checking whether said DR Pod and DR Location information was sent from SNOW at return to a main cloud control platform workflow after a successful modifying of said NSX Firewall Rule,
wherein if said DR Pod and said DR Location information was sent from SNOW then calling a same wrapper workflow for said DR Pod and making same modifications to a DR Firewall Rule, wherein the NSX Firewall Rule on DR site being searched by name+DR suffix; wherein if said DR Pod and said DR Location information was not sent from SNOW then executing a Provision Firewall Rule Configuration Items in said SNOW CMDB workflow to keep said CMDB up to date;
updating a status of a request to said SNOW via said REST API by means of said Master SNOW Workflow Dispatcher.

13. The process for managing security group on a cloud management platform portal according to claim 10, wherein a set of software codes is executed on the platform for deleting a SDN security group rule, wherein said deleting said SDN security group rule comprises
inviting said user to fill in said form and submit said form in said SNOW through said interactive interface of the cloud management platform portal;
calling a REST API call;
passing the REST API call to said Master VRO dispatcher by means of the MID server;
calling said at least one SSR Delete SDN Security group Rule workflow by dispatcher;
triggering a Delete NSX Firewall Rule wrapper by means of the Master workflow;
triggering said remote workflow on said slave VRO by means of the NSX Firewall Rule wrapper;
updating data on a NSX Firewall via said REST API by means of said slave VRO workflow;
if said DR Pod exists, then triggering, "in a same way of removing, of said NSX Firewall Rule in said slave VRO of said DR Pod;
triggering a Provision/Decommission Firewall Rule Configuration Items in said CMDB workflow by means of the Master VRO workflow;
updating said CMDB;
updating a status of a request to said SNOW via said REST API by means of the Master SNOW Workflow dispatcher.

* * * * *